United States Patent [19]

Ibe et al.

[11] Patent Number: 4,928,318
[45] Date of Patent: May 22, 1990

[54] OPTICAL SIGNAL TRANSMISSION SYSTEM INCLUDING PULSED FM MODULATOR/DEMODULATOR

[76] Inventors: Hiroyuki Ibe, 1-3-1-807, Namiki, Kanazawa-ku, Yokohama-shi; Taro Shibagaki, 1-29-5, Minamimagome, Oota-ku, Tokyo; Fumihiko Shimizu, 1F-3, Hikari-So, 2-30-2, Konan-ku, Yokohama-shi, all of Japan

[21] Appl. No.: 136,534

[22] Filed: Dec. 22, 1987

Related U.S. Application Data

[63] Continuation-in-part of Ser. No. 831,864, Feb. 24, 1986, abandoned.

[30] Foreign Application Priority Data

Feb. 28, 1985 [JP] Japan .................. 60-39298

[51] Int. Cl.$^5$ .............................................. H04B 9/00
[52] U.S. Cl. .................. 455/608; 332/112; 340/825.64; 375/23
[58] Field of Search .......... 455/608; 375/23; 340/825.64; 332/9 R; 329/107

[56] References Cited

U.S. PATENT DOCUMENTS 4,399,564 8/1983 Cowen ........................ 455/608
4,435,682 3/1984 Boudault et al. ............ 329/107

OTHER PUBLICATIONS

Sato et al–"Pulse Interval and Width Modulation'–'–IEEE Trans. on Cable Television–vol. CATV-3 #4 Oct. 1978 pp. 165–173.
Yoneda et al–"Optical Fiber Versatile Transmission'–'–Review of Elec. Comm. Labs. vol 27 #11-12–(Nov.–Dec. 1979) pp. 936–948.
Pouliot–Have You Considered V/f Converters? Analog Dialogue 9-3 1975–pp. 6–9.
Winkel et al–The Art of Digital Design–Prentice Hall, Englewood Cliffs, N.J.–1980 pp. 118–122, 143.
NEW ELECTRONICS, vol. 9, No. 13, Jun. 29, 1976, pp. 91–92, London, GB; D. Dyer: "v/F and F/V converters" * p. 91, left-hand col., lines 18–50; FIGS. 1,2,3 *.
NTG-Fachberichte Issls 80, The International Symposium on Subscriber Loops and Services, Munich, Sep. 15–19, 1980, vol. 73, pp. 228–232, VDE-Verlag Gmbh, Berlin, DE; D. J. Brace et al.: "Optical fibre transmission in the BPO local distribution network" * p. 230, right-hand col., lines 1–30; FIG. 6 *.
ELEKTRONIK, No. 6, 1974, pp. 219–220, Munich, DE; J. KUHLWETTER "Einfacher, hochgenauer Spannungs-Frequenz-Umsetzer" *Whole article *.
Patent Abstracts of Abstracts, vol. 5, No. 11 (E-42)[683], Jan. 23, 1981 &JP-A-55 138 936 (Nippon Denki K.K.) 30-10-1980 * Abstract *.
Patent Abstracts of Japan, vol. 10, No. 5 (E-372)[2062], Jan. 10, 1986; & JP-A-60 170 359 (Meidensha K.K.) 03–09–1985.

Primary Examiner—Robert L. Griffin
Assistant Examiner—L. Van Beek

[57] ABSTRACT

In the pulsed FM system, the input signal is first modulated into the pulse FM signal. Thereafter, this pulse FM signal is modulated into the pulsed FM signal by the frequency divider. This pulsed FM system is suitable to CATV.

9 Claims, 6 Drawing Sheets

OPTICAL SIGNAL TRANSMISSION SYSTEM INCLUDING PULSED FM MODULATOR/DEMODULATOR

This application is a continuation-in-part of application Ser. No. 06/831,864, filed on Feb. 24, 1986, now abandoned.

BACKGROUND OF THE INVENTION

1. Field of the Invention

The present invention generally relates to an optical signal transmission system, and more particularly to an optical signal transmission system employing a novel circuit in a pulsed frequency modulation system.

2. Description of the Prior Art

In short-haul television transmission for subscribing systems and cable television systems (referred to as "CATVs"), a light source is directly intensity-modulated in response to an input signal in order to easily transmit analog information such as an image (picture) or speech through an optical signal transmission line such as optical fiber cables. In such transmission systems, however, modulation distortion occurs due to poor linearity of the light source itself, resulting in a degradation of transmission quality. To achieve high-quality signal transmission with a relatively simple scheme, the following system is expected. An analog signal is pre-modulated by an electronic circuit into a pulse signal. Light from the light source is then intensity-modulated in response to this pulse modulated signal. Such modulation systems have been proposed in the form of PWM (pulse width modulation system), PDM (pulse duration modulation system), PFM (pulse frequency modulation system) and pulsed frequency modulation system. Among these systems, the pulsed FM system is preferred for increasing utilization efficiency of the transmission frequency band. This system has many advantages in that multiple transmission can be easily performed, S/N (signal-to-noise) ratio is improved, and offset DC components can be eliminated by AC coupling means in the reception side.

In principle, in the pulsed FM system, the FM-modulated analog signal is processed in a predetermined way to obtain a pulsed FM signal. This pulsed FM system differs from the PFM (pulse frequency modulation system) in that pulse width as well as pulse frequency are changed in response to the level of the analog signal to be transmitted. Although a modulator capable of a large frequency shift must be employed in order to obtain a pulsed FM signal, it is conventionally difficult to easily produce such a modulator. A voltage-controlled multivibrator (VCM) may be considered as one means for obtaining a pulsed FM signal. In general, when input voltage is set relatively low, the voltage-controlled multivibrator is subjected to a degradation of linearity in voltage-frequency characteristics due to the non-linearity of the transistors constituting this multivibrator. As a result, modulation distortion occurs and the modulation factor ($\Delta f/f0$) is insufficiently high. Since it is also difficult to regulate the voltage-frequency and capacitance characteristics in this case, the number of components must be necessarily increased. Accordingly, indispensable requirements, i.e., simplification of transmission systems, to subscribing systems and CATVs cannot be satisfied.

Furthermore, since the pulsed FM signal does not include baseband signal components, it precludes the use of a simple demodulator in the reception side. For example, basic spectral components of the pulsed FM signal are extracted by a band-pass filter and are demodulated by an analog signal processing method. This type of analog signal processing is normally employed by normal FM radio receivers as such a modulation system using a phase locked loop (PLL). When a pulsed FM signal with a large frequency shift is demodulated by the analog FM demodulator, the number of circuit elements must be necessarily increased in order to improve the linearity of the frequency-voltage conversion characteristics.

On the other hand, when noises (e.g., sinusoidal noises) correlated with the time, but not with random noises, are mixed in the receiver unit, a pulse phase or position of a pulse having a predetermined width is changed in proportion to a differential of applied correlated noises as a function of time. A change in pulse position results in variations in output from a low-pass filter. In particular, the time-correlated noises mixed in the receiver unit are known as modal noises when a laser diode is used as a light source in the receiver unit and a multi-mode type fiber is used.

It is therefore an object of the present invention to provide an optical signal transmission system which overcomes problems of the nonlinearity, noise and circuit arrangement limitations of the conventional optical transmission system.

Another object of the present invention is to provide an optical signal transmission system which highly improves modulation distortions.

A still further object of the present invention is to provide an optical signal transmission system which produces a high quality pulsed FM signal with a simple ciruit arrangement.

SUMMARY OF THE INVENTION

These objects of the invention can be accomplished by providing an optical signal transmission system comprising:

means for modulating an input signal to produce a pulse frequency modulated transmission signal;

means for frequency-dividing the pulse frequency modulated transmission signal to produce a pulsed frequency modulated transmission signal;

first converting means for converting the pulsed frequency modulated transmission signal into a corresponding optical signal;

means for transmitting the optical signal derived from the first converting means;

second converting means for converting the optical signal received from the first converting means via the transmitting means into a pulsed frequency modulated reception signal;

third converting means for converting the pulsed frequency modulated reception signal into a pulse frequency modulated reception signal; and means for demodulating the pulse frequency modulated reception signal to produce a reception signal corresponding to the input signal.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF PREFERRED EMBODIMENTS

ARRANGEMENT OF OPTICAL TRANSMISSION SYSTEM

Figure 1:
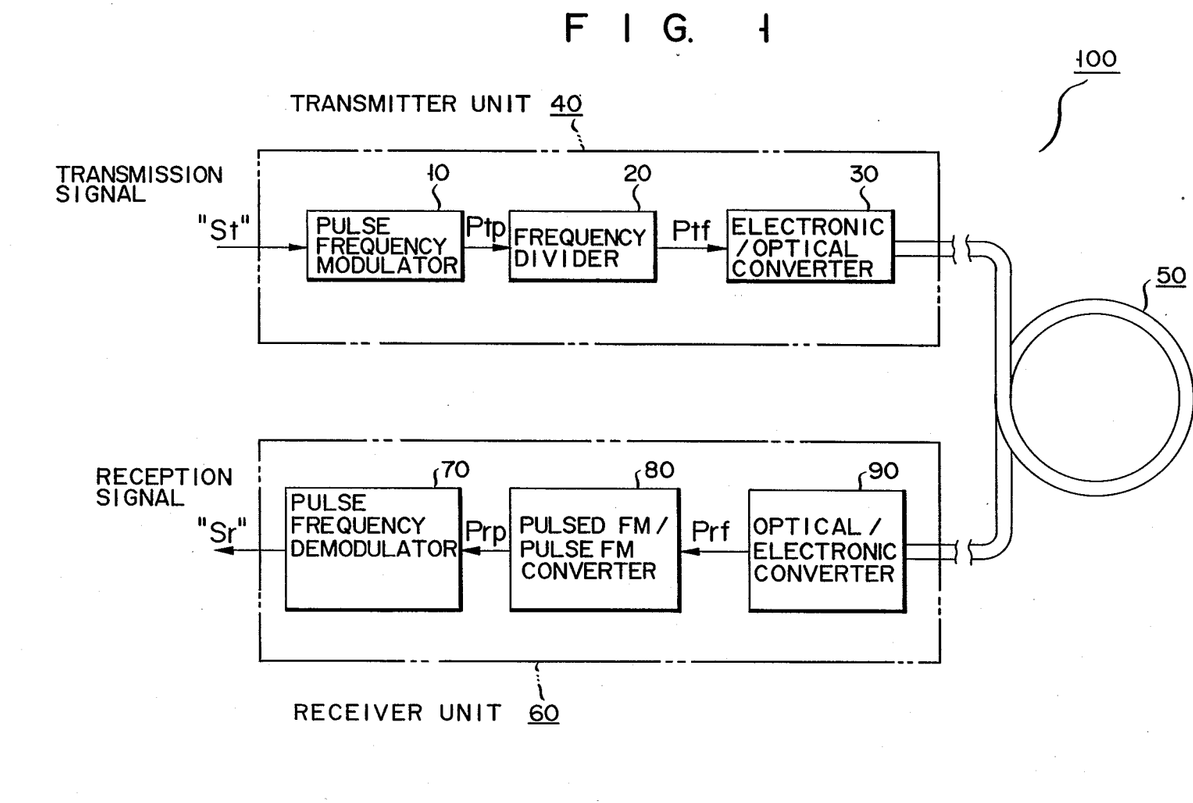
FIG. 1 is a schematic block diagram of an optical signal transmission system according to a preferred embodiment the invention.

Referring to FIG. 1 there is shown a functional block diagram of an optical signal transmission system 100 according to a preferred embodiment of the invention. Optical signal transmission system 100 mainly includes a transmitter unit 40, an optical fiber cable 50 and a receiver unit 60. Transmitter unit 40 is optically coupled via optical fiber cable 50 to receiver unit 60. The optical fiber cable uses a multi-mode fiber or a single-mode fiber.

Transmitter unit 40 includes a pulse frequency modulator (PFM modulator) 10 for PFM-modulating a transmission signal "St" as an input signal, a frequency divider 20 for frequency-dividing a PFM-modulated signal "Ptp" from modulator 10 at a predetermined frequency division ratio, and an electronic/optical converter 30 for converting a pulsed frequency modulated signal "Ptf" from divider 20 to an optical pulse signal, thereby transmitting the resultant transmission signal to optical fiber cable 50.

Receiver unit 60 coupled to transmitter unit 40 through optical fiber cable 50 includes an optical/electronic converter 90 for converting a received optical pulse signal (corresponding to the above transmission signal) to an electrical signal in order to obtain a rectangular pulse signal, a pulsed FM/pulse FM converter 80 for converting the pulsed FM signal "Prf" to a pulse frequency modulated signal, and a pulse frequency demodulator 70 for demodulating the resultant PFM signal as an original transmission signal or reception signal "Sr".

PRODUCTION OF PULSED FM SIGNAL

Figure 2:
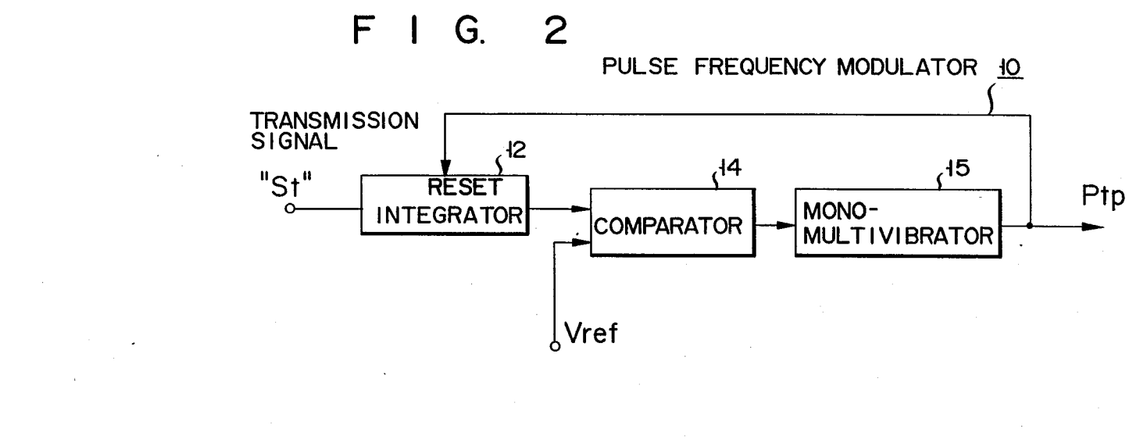
FIG. 2 is a functional block diagram of the internal circuit of the pulse frequency modulator 10 shown in FIG. 1.
Figure 3:
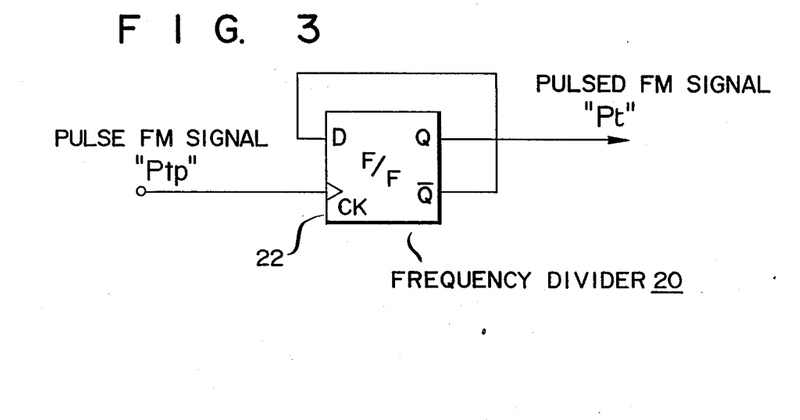
FIG. 3 is a typical circuit diagram of the frequency divider shown in FIG. 1.
Figure 4:
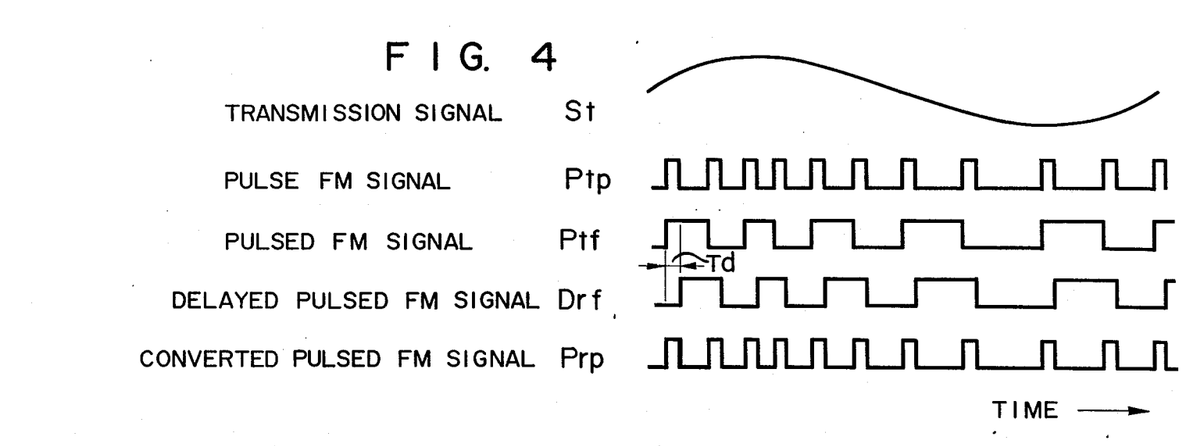
FIG. 4 shows, a waveform chart of the signals produced in circuit shown in FIG. 1.

Referring now to pulse frequency modulator 10 as shown in FIG. 2 and frequency divider 20 as shown in FIG. 3 in combination with a waveform chart as shown in FIG. 4, production of pulsed FM signals, according to the invention, will be described in detail.

A circuit arrangement of modulator 10 is shown in FIG. 2. Analog signals such as video and audio, and data signals are supplied, as transmission signal "St" (FIG. 4), as discrete signals, or as a frequency-divided multiplexed signal, to integrator 12. Integrator 12 generates a sawtooth wave with a ramp corresponding to a voltage level of the input signal. In this case, the time required for charging an internal capacitor (not shown in detail) in integrator 12 to a predetermined level is proportional to the input voltage. An output signal from integrator 12 is compared in comparator 14 with reference voltage Vref. The time required for inverting the output voltage from comparator 14 to "1" level is proportional to the level of the input signal. A binary signal from comparator 14 is processed in mono-multivibrator 15 to have a predetermined pulse width, thus producing the pulse FM signal "Ptp" shown in FIG. 4. It can be seen that the pulse frequency of the pulse FM signal "Ptp" is changed but its pulse width remains constant. The pulse FM signal "Ptp" is fed back to integrator 12, functioning as a reset signal thereto.

Divider 20 includes, for example, D-type flip-flop 22, as shown in FIG. 3. The pulse FM signal "Ptp" from modulator 10 is supplied to the clock terminal CK of flip-flop 22. Data terminal D of flip-flop 22 is interconnected to output terminal $\overline{Q}$. Therefore, the output from frequency divider 20 is derived as the pulsed FM signal "Ptf" at output terminal Q of flip-flop 22 (see FIG. 4).

As is apparent from FIG. 4, in frequency divider 20, flip-flop 22 is enabled at the leading edge portion of the supplied pulse FM signal. A frequency division ratio of divider 20 is set to be ½.

In the present invention, the transmission signal "St" obtained by properly processing video or audio signals is first pulse FM modulated, and the resultant pulse FM signal "Ptp" is frequency-divided to produce a high-quality pulsed FM signal "Ptf". Thus, according to the present invention the pulsed FM signal "Ptf" is easily produced in the simple circuit arrangement described above.

The resultant pulsed FM signal "Ptf" is then converted by electronic/optical converter 30 into an optical signal (not shown, but analogous to the pulsed FM signal "Ptf"). The optical signal is subsequently transmitted to receiver unit 60 through optical fiber cable 50. The electronic/optical converter comprises a laser diode for emitting a laser beam corresponding to the pulsed FM signal Ptf.

REPRODUCTION OF PULSED FM SIGNAL

Figure 5:
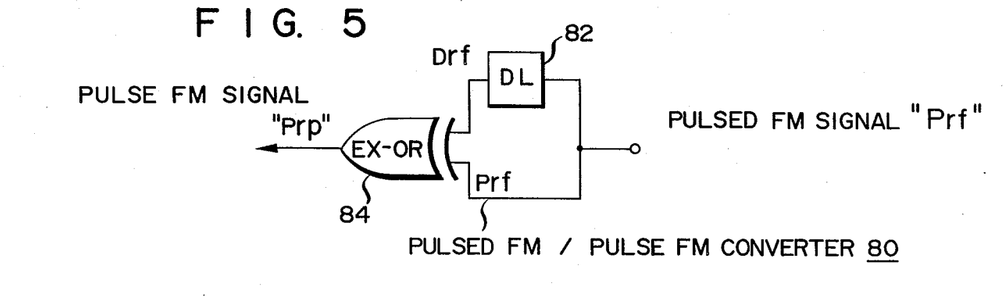
FIG. 5 is a typical circuit diagram of the pulsed FM/pulse FM converter 80 shown in FIG. 1.

The optical pulsed FM signal transmitted through optical fiber cable 50 undergoes considerable transmission distortions and adverse effects from noises. The transmitted optical signal is received by receiver unit 60 and converted by optical/electronic converter 90 to a pulsed FM signal "Prf". The pulsed FM signal "Prf" is supplied to pulsed FM/pulse FM converter 80 (shown in FIG. 5). In this converter 80, the received pulsed FM signal "Prf" and a delayed pulsed FM signal "Drf" (shown in FIG. 4), obtained by delaying the pulsed FM signal "Prf" in a delay circuit 82 for a predetermined time Td, are compared in an exclusive OR circuit 84. An output from exclusive OR circuit 84 serves as a pulse FM signal "Prp" with the pulse width shown in FIG. 4, that is, as the converted pulsed FM signal.

Figure 6:
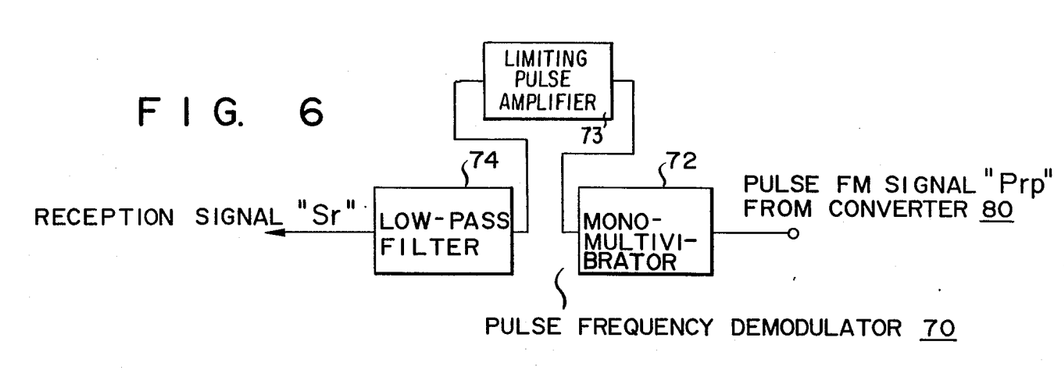
FIG. 6 is a typical circuit diagram of the pulse frequency 70 shown in FIG. 1.

The pulse FM signal "Prp" is demodulated in pulse frequency demodulator 70. Demodulator 70 includes a mono-multivibrator 72, limiting pulse amplifier 73 and a low-pass filter 74, as shown in FIG. 6. The pulse FM signal "Prp" from converter 80 is subjected by mono-multivibrator 72 to pulse width regulation. Only the baseband components of the pulse FM signal with a predetermined pulse width are extracted by low-pass filter 74, thus obtaining original transmission signal or reception signal "Sr".

According to the above embodiment, firstly the pulse frequency modulated signal is obtained before production of the pulsed FM signal. The pulse FM signal can be demodulated under the improved linearity by integrator 12 and comparator 14. In addition, when a time constant of integrator 12 is set arbitrarily, a variable frequency width is easily increased. Therefore, the pulsed FM signal produced by the system of this embodiment is a signal with the improved linearity and a high degree of demodulation. It should be noted that, in accordance with the invention, only a frequency divider is used to derive the pulsed FM signal from the pulse FM signal, thus avoiding complex circuitry.

On the receiver unit 60, the received pulsed frequency modulated signal is not demodulated directly but demodulated after the reception signal is converted into the pulse FM signal. Since the baseband components excluded from the pulsed FM signal are included in the pulse FM signal, the baseband components can be filtered through the low-pass filter to achieve demodulation. Therefore, the circuit arrangement can be further simplified by employing such a demodulation manner. Since limiting pulse amplifier 73 follows mono-multivibrator 72, the pulse FM signal is amplifier by limiting pulse amplifier 73 with the amplitude components being limited. That is, the signal components of the pulse FM signal which correspond to a high level are amplified with its upper level being limited at a predetermined level and the signal components which correspond to a low level are amplified with its lower level being limited at a predetermined level. Accordingly, the amplitude components included in noise are not amplified by a large level, while the signal components can be effectively amplified. As a result, after the pulse FM signal amplified is passed through low pass filter 74, it need not be largely amplified by the analog amplifier following the filter 74, when its level is matched to the level of video signal, e.g., 1 Vpp. Thus, the noise components based on the analog amplifier are reduced, resulting in an improved S/N ratio.

PRACTICAL CIRCUIT OF PULSED FM/PULSE FM CONVERTER

Figure 7:
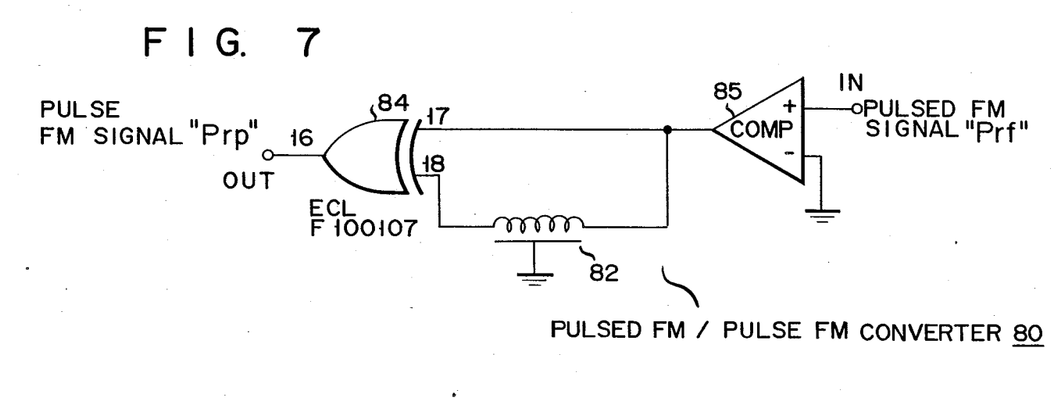
FIG. 7 is a practical circuit diagram of the pulsed FM/pulse FM converter 80 shown in FIG. 1.

A practical circuit of pulsed FM/pulse FM converter 80 will be described with reference to FIG. 7.

In practice, a comparator 85 is arranged between optical/electronic converter 90 and converter 80. As seen from FIG. 7, since its arrangement and operation are well known, a detailed description thereof will be omitted. Model ECL F100107 available from Fairchild Inc. is employed as exclusive OR circuit 84, and its typical pin numbers 16, 17 and 18 are shown in FIG. 7.

MODIFICATIONS OF FREQUENCY DIVIDER

Figure 8:
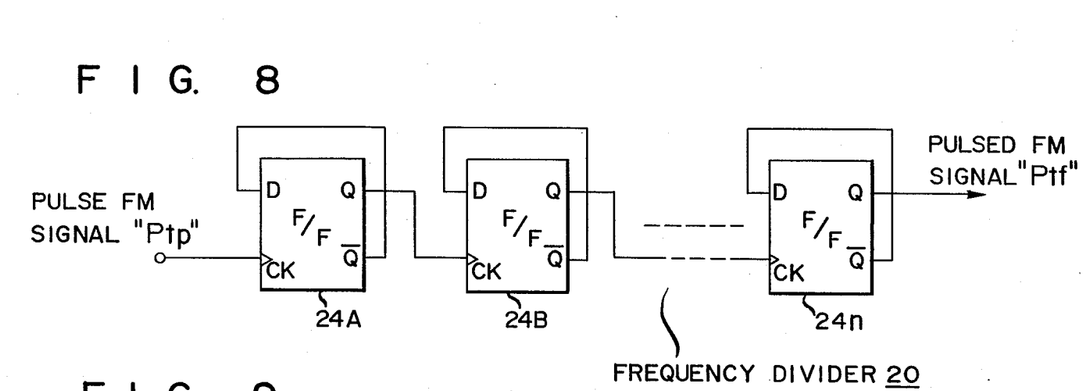
FIG. 8 is a circuit diagram of one n-staged frequency divider.

Frequency divider 20 shown in FIG. 3 is single stage D-type flip-flop 22. However, according to the present invention, the number of frequency division stages may be determined arbitrarily. For example, as shown in FIG. 8, n D-type flip-flops 24A, 24B, ... 24n can be arranged to frequency-divide the pulse FM signal "Ptp" at a ratio of 1/(n+1).

Figure 9:
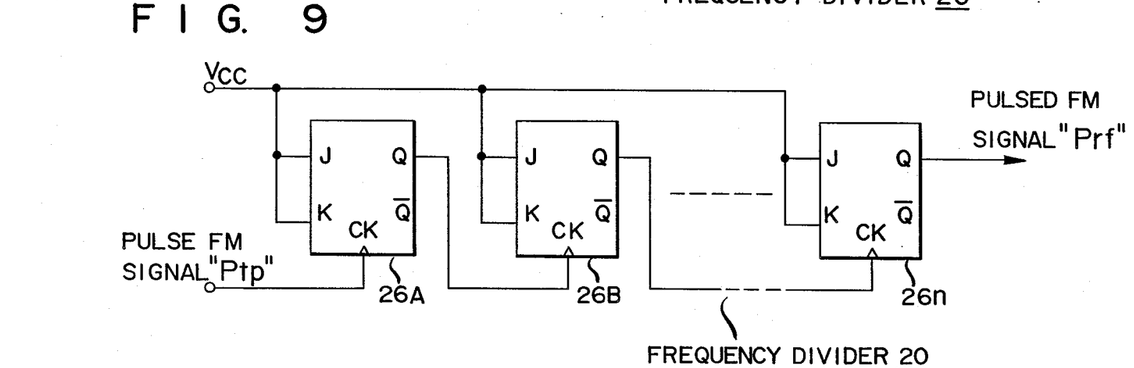
FIG. 9 is a circuit diagram of one n-staged frequency divider.

Alternatively, as shown in FIG. 9, frequency divider 20 may be constituted by n J-K flip-flops 26A, 26B, ... 26n.

Figure 10:
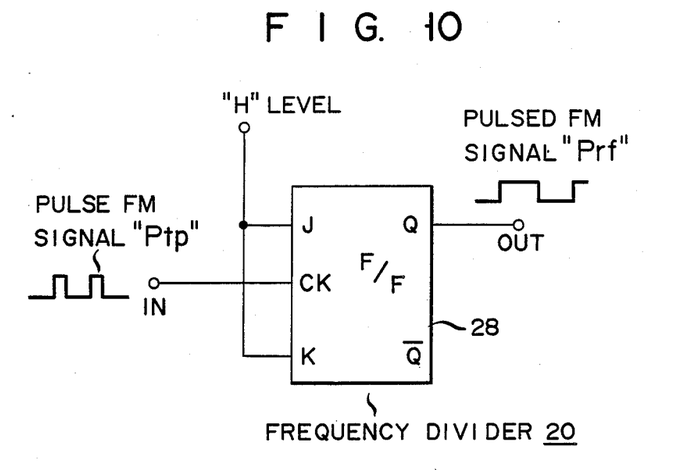
FIG. 10 is a circuit diagram of another single-staged frequency divider.

Furthermore, one-stage J-K flip-flop 28, shown in FIG. 10, may be used in place of one-stage D-type flip-flop 22 of FIG. 3.

Figure 11:
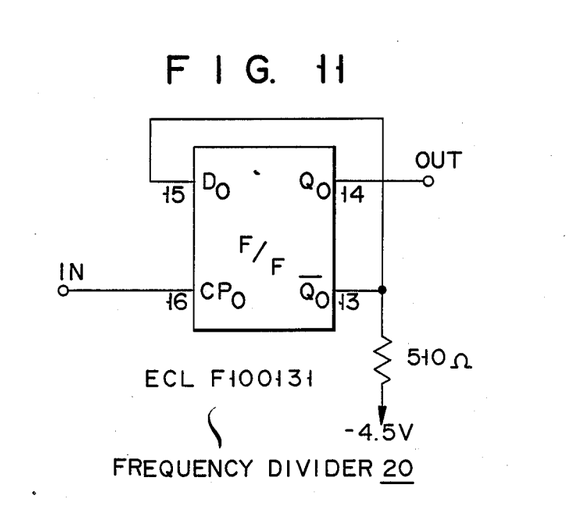
FIG. 11 is a circuit diagram of a practical frequency divider.

In the embodiment shown in FIG. 3, model ECL F100131 available from Fairchild Inc. is used as frequency divider 20, as shown in FIG. 11. Typical pin numbers 13 to 16 are written in the same manner as in FIG. 7.

According to the present invention as described above, the frequency division ratio of frequency divider 20 can be set arbitrarily. For example, when a frequency division ratio of $\frac{1}{2}$ (i.e., a one-stage flip-flop) is employed, the center frequency and frequency deviation of the input pulse FM signal is known to be improved as compared with other frequency dividers, e.g., $\frac{1}{4}$ and $\frac{1}{8}$ dividers.

In general, the pulse frequency modulator has a wider variable frequency range and improved linearity within this variable range, and is substantially free from modulation distortion. As compared with a conventional arrangement employing a voltage-controlled multivibrator, a pulse FM signal with a high degree of modulation can be obtained. According to the present invention, since the pulsed FM signal can be obtained by simply frequency-dividing the pulse FM signal into a predetermined number of stages, the resultant pulsed FM signal has high quality. The pulse frequency modulator and the frequency divider can be constituted by very simple circuits, which eliminates the need of a complicated transmitter unit configuration.

Since the pulsed FM signal is first converted to the pulse FM signal by the receiver unit, demodulation can be performed simply by filtering the baseband components included in the pulse FM signal through the low-pass filter. Therefore, the arrangement of the receiver unit ca also be simplified.

Thus, the transmitter and receiver units are simplified, and high-quality pulsed FM signals with high frequency band-utilization efficiency can be transmitted.

According to the present invention, the pulsed FM signal is converted by the delay detection circuit (including the delay and exclusive OR circuits) into the pulse FM signal. The pulse train of the pulse FM signal is alternately generated as a pair at the leading and trailing edge portions of the pulsed FM signal. When noises (e.g., sinusoidal noises) correlated with the time but not with random noise, are applied to the receiver unit, the pair of pulse FM pulses are shifted in opposite directions, and the influence of the noises does not appear at the output of the low-pass filter.

Even if the baseband components are included in the pulsed FM signals in the transmitter unit, the baseband components do not influence the demodulated output.

What is claimed is:

1. An optical signal transmission system comprising:
    means for frequency-modulating an input signal to produce a pulse frequency-modulated (FM) transmission signal;
    means for frequency-dividing the pulse frequency-modulated transmission signal to produce a pulsed frequency-modulated (PFM) transmission signal;
    first converting means, connected to said frequency-dividing means and including a laser means for emitting a laser light, for converting the pulsed frequency-modulated transmission (PFM) signal into a corresponding laser light signal;

second converting means for converting the laser light signal output from said first converting means, into a pulsed frequency-modulated (PFM) reception signal;

transmission means, connected between said first and second converting means and including a multimode fiber means, for transmitting the laser light signal from said first converting means to said second converting means;

third converting means, connected to said second converting means and including delay detection means, for converting the pulsed frequency-modulated (PFM) reception signal into a pulse frequency-modulated (FM) reception signal, thereby decreasing a modal noise; and means for demodulating the pulse frequency-modulated (FM) reception signal to produce a reception signal corresponding to the input signal; including a mono-multivibrator for receiving said pulse frequency-modulated reception signal from said third converting means to output a pulse FM signal with a constant pulse width; a limiting pulse amplifier connected to said mono-multivibrator for amplifying the pulse FM signal with amplitude thereof being limited; and a low pass filter series connected to said limiting pulse amplifier for filtering baseband components contained in said pulse FM signal so as to derive said reception signal.

2. A system as claimed in claim 1, wherein said modulating means is a pulse frequency modulator.

3. A system as claimed in claim 2, wherein said pulse frequency modulator includes:

an integrator for producing a sawtooth wave signal whose gradient is proportional to a level of said input signal;

a comparator for comparing the sawtooth wave signal with a reference voltage so as to derive a digitized signal; and a mono-multivibrator for shaping the digitized signal to produce said pulse frequency-modulated transmission signal.

4. A system as claimed in claim 1, wherein said frequency dividing means is a single-staged D type flip-flop.

5. A system as claimed in claim 1, wherein said frequency dividing means is a plurality of cascade-connected D type flip-flops.

6. A system as claimed in claim 1, wherein said frequency dividing means is a plurality of cascade-connected J-K type flip-flops.

7. A system as claimed in claim 1, wherein said frequency dividing means is a single-staged J-K type flip-flop.

8. A system as claimed in claim 1, wherein said third converting means includes:

an exclusive OR circuit having first and second input terminals; and a delay circuit connected to said first input terminal of the exclusive OR circuit, for delaying said pulsed frequency-modulated reception signal, whereby the delayed pulsed frequency-modulated reception signal supplied to said first input terminal and the pulsed frequency-modulated reception signal directly supplied to said second input terminal are exclusive-ORed by said exclusive OR circuit so as to derive said pulse frequency-modulated reception signal.

9. A system as claimed in claim 1, wherein said transmitting means is an optical fiber cable.

* * * * *

UNITED STATES PATENT AND TRADEMARK OFFICE
CERTIFICATE OF CORRECTION

PATENT NO.   : 4,928,318
DATED        : May 22, 1990
INVENTOR(S)  : Hiroyuki IBE, et al It is certified that error appears in the above-identified patent and that said Letters Patent is hereby corrected as shown below:

On the title page:

The Assignee's name is missing, it should read

--Kabushiki Kaisha Toshiba--

The name of the firm or attorney of record is missing it should read

--OBLON, SPIVAK, McCLELLAND, MAIER & NEUSTADT, P.C.--

Signed and Sealed this

Tenth Day of March, 1992

Attest:

HARRY F. MANBECK, JR.

*Attesting Officer*  *Commissioner of Patents and Trademarks*